United States Patent
Wong

(10) Patent No.: US 7,402,028 B2
(45) Date of Patent: Jul. 22, 2008

(54) PRESSURISATION SYSTEM

(75) Inventor: Shih Yi Wong, 114, Lorong H., Telok Kurau, Singapore (SG) 426141

(73) Assignee: Shih Yi Wong, Singapore (SG)

( * ) Notice: Subject to any disclaimer, the term of this patent is extended or adjusted under 35 U.S.C. 154(b) by 471 days.

(21) Appl. No.: 10/519,576

(22) PCT Filed: Jun. 29, 2002

(86) PCT No.: PCT/SG02/00145

§ 371 (c)(1),
(2), (4) Date: Dec. 28, 2004

(87) PCT Pub. No.: WO2004/002897

PCT Pub. Date: Jan. 8, 2004

(65) Prior Publication Data

US 2005/0224400 A1    Oct. 13, 2005

(51) Int. Cl.
  F04B 17/03    (2006.01)
  F04B 23/06    (2006.01)
  F04B 35/00    (2006.01)
  B01D 63/00    (2006.01)
  F04B 17/00    (2006.01)

(52) U.S. Cl. .................. 417/328; 417/329; 417/331; 210/650; 210/652; 210/321.6; 60/502; 290/53

(58) Field of Classification Search ............... 417/328, 417/329
See application file for complete search history.

(56) References Cited

U.S. PATENT DOCUMENTS

| | | | | |
|---|---|---|---|---|
| 2,490,484 | A | * | 12/1949 | Snyder ...................... 417/329 |
| 3,126,830 | A | * | 3/1964 | Dilliner ..................... 417/331 |
| 4,367,140 | A | | 1/1983 | Wilson |
| 4,698,969 | A | * | 10/1987 | Raichlen et al. ............... 60/502 |
| 5,975,865 | A | * | 11/1999 | Manabe ..................... 417/331 |
| 6,392,314 | B1 | * | 5/2002 | Dick .......................... 290/53 |

FOREIGN PATENT DOCUMENTS

DE  3831965    3/1990
WO  WO 96-34678  11/1996

OTHER PUBLICATIONS

Wong, Shih Yi, International Application No. PCT/SG 2002/000145, International Preliminary Examination Report, mailed Dec. 27, 2004, 4 pages.

* cited by examiner

*Primary Examiner*—Krishnan S Menon
(74) *Attorney, Agent, or Firm*—Conley Rose, P.C.

(57) ABSTRACT

A pressurization device is described mobilizing gravity to mobilize seawater and to employ a weight (56) for gravitionally applying a force to and thereby pressurizing an enclosed pocket (58) of seawater, resulting in low energy utilisation. Energy is further recovered from the flow of pressurized seawater that is supplied to the desalination system (20), resulting in a mechanically robust and energy efficient pressurisation system.

13 Claims, 3 Drawing Sheets

PRESSURISATION SYSTEM

FIELD OF INVENTION

The present invention relates generally to a pressurisation system. In particular, the invention relates to a pressurisation system for pressurising fluids for a desalination system.

BACKGROUND

Fluids, or water in particular, are pressurised for a multitude of applications. One such application is in a desalination system using a reverse osmosis (RO) process for producing potable water. Seawater and brackish water are often used in the RO process. However, the seawater from a water source, for example the sea, has to be highly pressurised before it is supplied to the desalination system for the RO process to be performed.

High pressure pumps, for example displacement pumps, are conventionally used for drawing the seawater from the water source, pressurising the drawn seawater by compressing the seawater within a volume and supplying the pressurised seawater to the desalination system. However, the energy consumption of each of these pumps is high which results in high operating costs. Systems using these high pressure pumps require a variation of components to reduce water supply pulsation and prevent over-pressurisation of downstream pipes for conveying pressurised seawater.

There is hence a need for a pressurisation system for addressing the deficiencies of high pressure pumps.

SUMMARY

In accordance with a first aspect of the invention, there is disclosed a pressurisation system comprising:
 a vessel having a chamber for receiving fluid thereinto, the fluid having a pressure,
 a plunger for enclosing a portion of the chamber to form an enclosure, the enclosure having a volume, and the plunger being movably coupled to and for cooperation with the chamber to reduce the volume of the enclosure, the chamber is shaped and dimensioned for the passage of the plunger therethrough and for the reciprocation of the plunger therewithin, the plunger for reciprocating along a longitudinal axis of the chamber generally parallel to the direction of gravitational acceleration, the plunger having a weight for gravitationally applying a compression force to the fluid to thereby reduce the volume of the enclosure and increase the pressure of the fluid; and
 a positioning device for comprising a hoist assembly and an electric actuator having a brake assembly for interacting with the hoist assembly to impede the reduction of the volume of the enclosure,
 wherein positioning of the plunger within the chamber is artificially controlled by the positioning device to allow the volume of the enclosure to be pre-determinable.

In accordance with a second aspect of the invention, there is disclosed a pressurisation method comprising the steps of:
 providing a vessel having a chamber;
 receiving fluid into the chamber, the fluid having a pressure,
 enclosing a portion of the chamber with a plunger to form an enclosure, the enclosure having a volume, and the plunger being movably coupled to and for cooperation with the chamber to reduce the volume of the enclosure, the chamber is shaped and dimensioned for the passage of the plunger therethrough and for the reciprocation of the plunger therewithin, the plunger for reciprocating along a longitudinal axis of the chamber generally parallel to the direction of gravitational acceleration, the plunger having a weight for gravitationally applying a compression force to the fluid to thereby reduce the volume of the enclosure and increase the pressure of the fluid; and
 providing a positioning device comprising a hoist assembly and an electric actuator having a brake assembly for interacting with the hoist assembly to impede the reduction of the volume of the enclosure,
 wherein positioning of the plunger within the chamber is artificially controlled by
 the positioning device to allow the volume of the enclosure to be pre-determinable.

In accordance with a third aspect of the invention, there is disclosed, a pressurisation method for pressurising fluids comprising the steps of:
 receiving fluid from a water source into a chamber of a vessel, the chamber having a longitudinal axis and being formed within the vessel, the water source having a water level and the fluid having a pressure;
 enclosing a portion of the chamber with a plunger to form an enclosure having a volume, the plunger having a weight, the fluid received in the chamber being contained in the enclosure, and the plunger being movable along the longitudinal axis of the chamber to one of reduce or increase the volume of the enclosure;
 gravitationally applying a force to the fluid by the plunger along the longitudinal axis of the chamber to reduce the volume of the enclosure and thereby increasing the pressure of the fluid, the pressure of the fluid being controlled by a positioning device being coupled to the plunger for positioning the plunger along the longitudinal axis thereby controlling the amount of force applied to the fluid, the positioning device comprising a hoist assembly and an electric actuator having a brake assembly for interacting with the hoist assembly to impede the reduction of the volume of the enclosure; and
 wherein positioning of the plunger within the chamber is artificially controlled by the positioning device to allow the volume of the enclosure to be pre-detenninable.

BRIEF DESCRIPTION OF THE DRAWINGS

Embodiments of the invention are described hereafter with reference to the following drawings, in which.

DETAILED DESCRIPTION

A pressurisation system for addressing the aforementioned deficiencies of conventional high pressure pump-based systems is described in this section.

Figure 1:
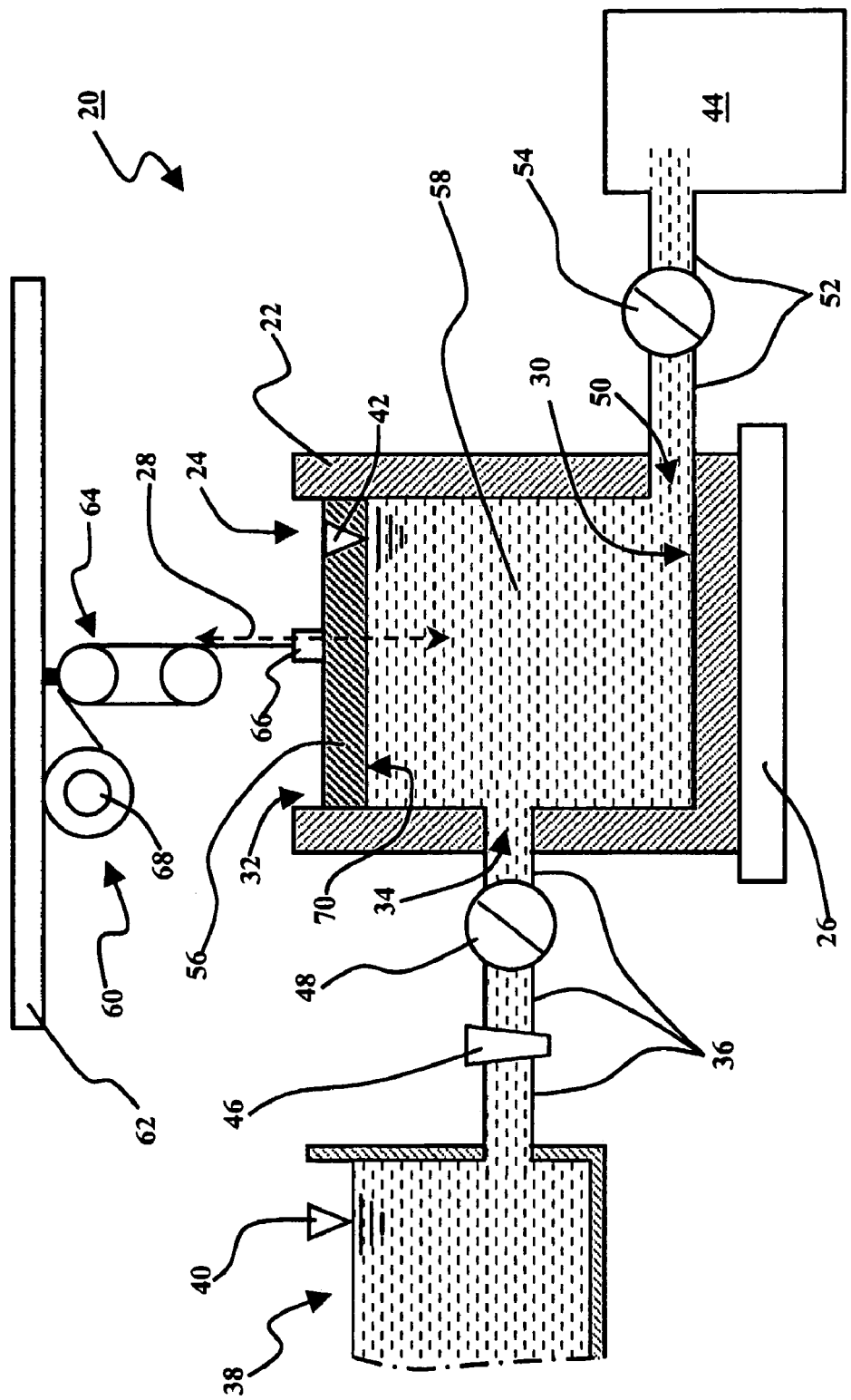
FIG. 1 is a front sectional view of a pressurisation system in accordance to an embodiment of the invention.

An embodiment of the invention, a pressurisation system 20 is described with reference to FIG. 1, which shows a front sectional view of the pressurisation system 20. The pressurisation system 20 comprises of a vessel 22 with an internally disposed chamber 24. The chamber 24 is preferably cylindrical with a longitudinal axis 28. The vessel 22 is disposed generally upright on a support surface 26 with the longitudinal axis 28 of the chamber 24 generally parallel to the direction of gravitational acceleration and generally perpendicular to the support surface 26. The chamber 24 has a base 30 and an opening 32 constituting two extremities of the chamber 24, with the base 30 being proximal to the support surface 26 and the opening 32 being distal to the support surface 26. The chamber 24 of the vessel 22 is preferably for containing water or the like fluids.

An inlet 34 is formed in the vessel 22 and adjacent to the opening 32 for receiving water into the chamber 24. An inlet conduit 36, preferably a pipe, connects a water source 38 to the inlet 34 of the vessel 22 with the water source 38 having a water level 40. The inlet 34 of the vessel 22 is positioned below the water level 40 of the water source 38 to create a pressure gradient (not shown) between the water source 38 and the chamber 24. This pressure gradient draws water from the water source 38 through the inlet conduit 36 and into the chamber 24 of the vessel 22. Pressure equilibrium is achieved when water in the chamber 24 reaches an equalised level 42.

The pressurisation system 20 is used with a desalination system 44 for water desalination, and is located within the proximity of an abundant water source, preferably the sea. The sea provides an abundance of seawater for the desalination system 44. However, seawater contains impurities that are harmful to both the pressurisation system 20 and the desalination system 44.

The pressurisation system 20 further comprises of a filtration assembly 46 and an inlet valve 48. Both the filtration assembly 46 and the inlet valve 48 are disposed along the inlet conduit 36 with the filtration assembly 46 being adjacent to the inlet valve 48. The filtration assembly 46 is for filtering particles of differing coarseness, for example silt, impurities and the like foreign bodies, from the seawater. The inlet valve 48 has two operating positions: an open position and a closed position (both not shown). When the inlet valve 48 is in the open position, seawater flows freely through the inlet 34 and into the chamber 24. However, when the inlet valve 48 is in the closed position, the seawater is prevented from reaching the inlet 34. The inlet conduit 36 is therefore in fluid communication with the chamber 24 when the inlet valve 48 is in the open position.

An outlet 50 is formed in the vessel 22 adjacent to the base 30 for discharging seawater from the chamber 24 therethrough. An outlet conduit 52, preferably a pipe, connects the outlet 50 of the vessel 22 to the desalination system 44. An outlet valve 54 is disposed along the outlet conduit 52 for controlling the supply of seawater from the vessel 22 to the desalination system 44. The outlet valve 54 is positionable between an open position and a closed position to respectively permit or restrict the flow of seawater from the vessel 22 to the desalination system 44. The outlet conduit 52 is in fluid communication with the vessel 22 and the desalination system 44 when the outlet valve 54 is in the open position.

The pressurisation system 20 further comprises a plunger 56 being slidably coupled to the vessel 22. The plunger 56 is shaped and dimensioned for sliding within the chamber 24 along the longitudinal axis 28. The opening 32 of the chamber 24 is shaped and sized for passage of the plunger 56 therethrough. The plunger 56 is disposed in the chamber 24 to form an enclosure 58 within the chamber 24, the enclosure having a volume dependent on the position of the plunger 56 along the longitudinal axis 88. A mechanical seal (not shown) is coupled to the plunger 56 and disposed along the circumference of the plunger 56 to seal the space between the periphery of the plunger 56 and the internal wall of the vessel 22 for creating a water-tight seal therebetween.

The plunger 56 is preferably made of concrete or any material with large mass and generally high density. The pressurisation system 20 further comprises a positioning device 60 attached to a support structure 62. Both the positioning device 60 and the support structure 62 are disposed above the opening 32 of the vessel 22. The positioning device 60 comprises a pulley assembly 64 having a hoisting attachment 66 for coupling the positioning device 60 to the plunger 56.

The positioning device 60 further comprises an electric motor 68 being mounted onto the support structure 62 and for engagement with the pulley assembly 64. The electric motor 68 interacts with the pulley assembly 64 for positioning the hoisting attachment 66 generally along the longitudinal axis 28 of the chamber 24 and thereby positioning the plunger 56 generally along the longitudinal axis 28 of the chamber 24.

The electric motor 68 is electrically connected to a controller (not shown) for controlling the positioning of the plunger 56 along the longitudinal axis 28 thereby varying the volume of the enclosure 58. Both the inlet valve 48 and the outlet valve 52 are electrically connected to the controller for positioning the inlet valve 48 and the outlet valve 52 between open and closed positions.

Figure 2:
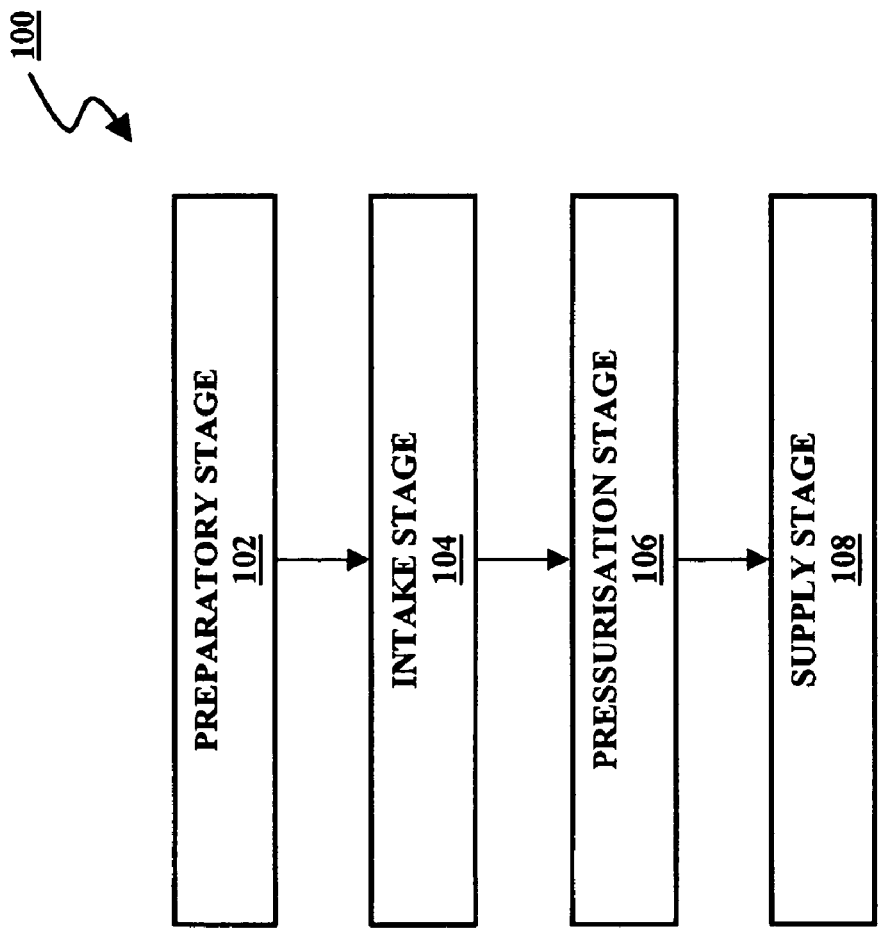
FIG. 2 is a process flow-chart of a pressurisation process applied by the pressurisation system of FIG. 1.

The desalination system 44 uses a reverse osmosis process that requires seawater to be supplied at a pressure of generally at least 80 atm (atmosphere). A pressurisation process 100 is described with reference to FIG. 2, which shows a process flowchart of the pressurisation process 100.

The pressurisation process 100 starts with a preparatory stage 102. The controller initially positions both the outlet valve 52 and the inlet valve 48 to the closed position. The controller further controls the positioning device 60 to position the plunger 56 towards the opening 32 of the chamber 24.

The controller then initiates an intake stage 104, by positioning the inlet valve 48 to the open position. The pressure gradient between the water source 38 and the chamber 24 influxes seawater from the water source 38 through the inlet conduit 36 and into the enclosure 58 of the chamber 24. Seawater from the water source 38 continues to fill the enclosure 58 until the seawater within the enclosure 58 reaches an equalised level 42. A level sensor (not shown) is disposed within the chamber 24 and is electrically connected to the controller for transmitting a level signal to the controller when the seawater within the enclosure 58 reaches the equalised level 42. In response to the level signal received from the level sensor, the controller positions the inlet valve 48 to the closed position. The seawater within the enclosure 58 has a pressure of approximately 1 atm before a pressurisation process.

The controller initiates a pressurisation stage 106, in response to the completion of the intake stage 104, by communicating with the positioning device 60 to position the plunger 56 towards the base 30 of the chamber 24 and thereby reducing the volume of the enclosure 58. The reduction of the volume of the enclosure 58 increases the pressure of the seawater within the enclosure 58. The plunger 56 is preferably made from concrete and therefore is heavily weighted. The weight of the plunger 56 applies force on the seawater within the enclosure 58 by means of gravity. The mechanical seal prevents seawater from leaking through the interface between the plunger 56 and the chamber 24.

The positioning device 60 further comprises a brake assembly (not shown) built into the electric motor 68 and being electrically connected to the controller. The brake assembly is for resisting the movement of the hoisting attachment 66 along the longitudinal axis 28 when a braking signal is received from the controller.

In the pressurisation stage 106, gravity pulls the plunger 56 towards the base 30 of the chamber 24, which can lead to over-pressurisation of the seawater within the enclosure 58. The brake assembly of the electric motor 68 is actuable to impede movement of the plunger 56 towards the base 30 of the chamber 24 and thereby maintaining the seawater at a constant pressure. Additionally, a pressure relief valve (not shown) is disposed in the chamber 24 to prevent the over-pressurisation of the seawater. The pressure of the seawater within the enclosure 58 is reducable by the positioning device 60 positioning the plunger 56 towards the opening 32 and away from the seawater within the enclosure 58.

The outlet valve 54 comprises a pressure sensor (not shown) disposed therein. The pressure sensor is electrically connected to the controller for transmitting a pressure signal to the controller, the pressure signal indicating an operating pressure being the pressure of the seawater measured at the pressure sensor. An interface 70 between the plunger 56 and the seawater within the enclosure 58 is generally planar. The operating pressure is dependent on the pressure of the seawater at the interface 70 and the mass of the seawater contained within the enclosure 58, with the mass of the seawater being a function of the distance between the interface 70 and the base 30 of the chamber 24, and the dimensions of the chamber 24.

The controller registers a reference pressure pre-defined by a user. The reference pressure is the pressure required by the desalination system 44 and is generally at least 80 atm. During the pressurisation stage 106, the controller controls the brake assembly to gradually increase the pressure of the seawater within the enclosure 58 and thereby increasing the operating pressure. Once the operating pressure reaches the reference pressure, the brake assembly is fully activated to prevent the plunger 56 from moving further towards the base 30 of the chamber 24.

Upon completion of the pressurisation stage 106, the controller proceeds with the supply stage 108. The pressurised seawater is supplied to the desalination system 44 in the supply stage 108 by the controller positioning the outlet valve 54 to the open position. When the pressurised seawater is being provided from the vessel 22 to the desalination system 44, the operating pressure of the seawater starts to decrease. During the supply stage 108, the operating pressure is maintained at the reference pressure by controlling the rate at which the plunger 56 moves towards the base 30 of the chamber 24, via operating the brake assembly of the electric motor 68.

The supply stage 108, is completed once the seawater within the enclosure 58 is substantially depleted. The controller responds to the completion of the supply stage 108 by re-initiating the preparatory stage 102. In the preparatory stage 102, both the inlet valve 48 and the outlet valve 54 are positioned to the closed position. The controller then moves the plunger 56 towards the opening 32 of the chamber 24.

Once the preparatory stage 102, is completed, the inlet valve 48 is positioned to the open position in the intake stage 104. The pressure gradient between the water source 38 and the chamber 24 draws water from the water source 38 into the chamber 24 and thereby replenishing the enclosure 58 with seawater. The pressurisation process 100 is cyclically reiterated in accordance to requirements by the desalination system 44 for pressurised seawater.

The pressurisation system 20 further includes a generator (not shown) disposed along the outlet conduit 52 adjacent to the outlet valve 54. The generator utilises a turbine array for converting the kinetic energy of the flowing pressurised seawater through the outlet conduit 52 towards the desalination system 44 during the supply stage 108, into kinetic energy of the turbine array. The generator then converts this form of kinetic energy of the turbine array into electrical energy that is stored and reused by the pressurisation system, for example, the positioning device 60.

Figure 3:
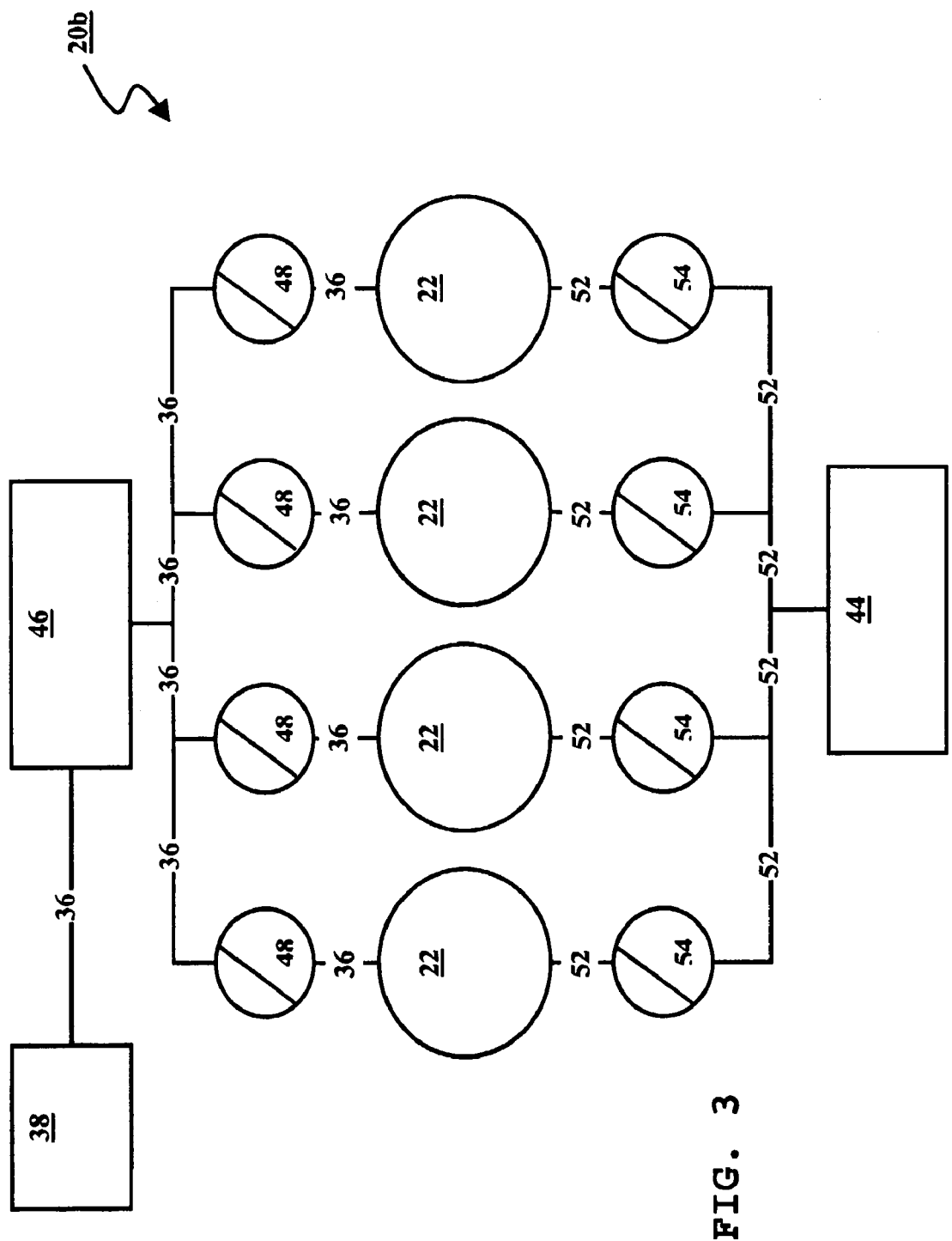
FIG. 3 is a system representation of the pressurisation system of FIG. 1 with a plurality of vessels.

A second embodiment of the invention, a pressurisation system 20b as seen in FIG. 3, which shows a system representation of the pressurisation system 20b, comprises of four main elements, each of which consists of a vessel 22, a chamber 24, a plunger 56 and a positioning device 60. The descriptions in relation to the structural configurations of and positional relationships among the vessel 22, the chamber 24, the plunger 56 and the positioning device 60 with reference to FIG. 1 are incorporated herein.

The pressurisation system 20b comprises a plurality of vessels 22. An inlet conduit 36 extends from a water source 38 to an inlet 34 of each vessel 22, with the plurality of vessels 22 drawing seawater from one water source 38. An outlet conduit 52 extends from an outlet 50 of each vessel 22 to a desalination system 44. Both the inlet conduit 36 and the outlet conduit 52 are in fluid communication with a chamber 24 of each vessel 22. The positional relationship between the vessel 22 and the water source 38 of FIG. 1 is incorporated herein for each of the plurality of vessels 22.

In accordance with the first embodiment, the pressurisation process 100 is also incorporated herein. However, the progress of the pressurisation process 100 for one vessel 22 lags the progress of the pressurisation process 100 for another vessel 22. For example, when a first vessel 22 is in a preparatory stage 102 with reference to FIG. 2, a second vessel 22 will be in an intake stage 104, a third vessel 22 will be in a pressurisation stage 106, and a fourth vessel 22 will be in a supply stage 108. This is to ensure that at any one time, one vessel 22 is in the supply stage 108, for supplying pressurised seawater to the desalination system 44.

An inlet valve 48, an outlet valve 54 and a positioning device 60 of each vessel 22 is electrically connected to a controller to coordinate and control the pressurisation process 100 of each vessel and to ensure that the desalination system 44 is continuously supplied with pressurised seawater.

The pressurisation system 20/20b described in this section utilises two embodiments of the invention to illustrate how the disadvantages of conventional pressure pumps are addressed. Although only two embodiments of the invention are disclosed, numerous modifications can be made to the embodiment without departing from the scope and spirit of the invention.

The invention claimed is:

1. A pressurisation system comprising:
   a vessel having a chamber for receiving fluid thereinto, the fluid having a pressure,
   a plunger for enclosing a portion of the chamber to form an enclosure, the enclosure having a volume, and the plunger being movably coupled to and for cooperation with the chamber to reduce the volume of the enclosure, the chamber is shaped and dimensioned for the passage of the plunger therethrough and for the reciprocation of the plunger therewithin, the plunger for reciprocating along a longitudinal axis of the chamber generally parallel to the direction of gravitational acceleration, the plunger having a weight for gravitationally applying a compression force to the fluid to thereby reduce the volume of the enclosure and increase the pressure of the fluid; and a positioning device comprising a hoist assembly and an electric actuator having a brake assembly for interacting with the hoist assembly to impede the reduction of the volume of the enclosure;

wherein positioning of the plunger within the chamber is artificially controlled by the positioning device to allow the volume of the enclosure to be pre-determinable.

2. The pressurisation system as in claim 1 the chamber having an outlet for discharging fluid from the enclosure.

3. The pressurisation system as in claim 2, further comprising:

an outlet conduit extending from the outlet to a desalination system, the outlet conduit being in fluid communication with the enclosure; and an outlet valve having an open position and a closed position for correspondingly permitting and impeding flow of fluid from the enclosure to the desalination system.

4. The pressurisation system as in claim 1, the chamber having an inlet for introducing fluid into the enclosure.

5. The pressurisation system as in claim 4, further comprising:

an inlet conduit extending from the inlet to a water source, the water source having a water level and the inlet conduit being in fluid communication with the enclosure; and an inlet valve having an open position and a closed position for correspondingly permitting and impeding flow of fluid from the water source to the enclosure.

6. The pressurisation system as in claim 5 wherein the chamber of the vessel is disposed vertically below the water level of the water source.

7. A pressurisation method comprising the steps of:

providing a vessel having a chamber;

receiving fluid into the chamber, the fluid having a pressure, enclosing a portion of the chamber with a plunger to form an enclosure, the enclosure having a volume, and the plunger being movably coupled to and for cooperation with the chamber to reduce the volume of the enclosure, the chamber is shaped and dimensioned for the passage of the plunger therethrough and for the reciprocation of the plunger therewithin, the plunger for reciprocating along a longitudinal axis of the chamber generally parallel to the direction of gravitational acceleration, the plunger having a weight for gravitationally applying a compression force to the fluid to thereby reduce the volume of the enclosure and increase the pressure of the fluid; and providing a positioning device comprising a hoist assembly and an electric actuator having a brake assembly for interacting with the hoist assembly to impede the reduction of the volume of the enclosure, wherein positioning of the plunger within the chamber is artificially controlled by the positioning device to allow the volume of the enclosure to be pre-determinable.

8. The pressurisation method as in claim 7, the chamber having an outlet for discharging fluid from the enclosure.

9. The pressurisation method as in claim 8, farther comprising the steps of:

providing an outlet conduit extending from the outlet to a desalination system, the outlet conduit being in fluid communication with the enclosure; and providing an outlet valve having an open position and a closed position for correspondingly permitting and impeding flow of fluid from the enclosure to the desalination system.

10. The pressurisation method as in claim 9, the chamber having an inlet for introducing fluid into the enclosure.

11. The pressurisation method as in claim 10 further comprising the steps of:

providing an inlet conduit extending from the inlet to a water source, the water source having a water level and the inlet conduit being in fluid communication with the enclosure; and providing an inlet valve having an open position and a closed position for correspondingly permitting and impeding flow of fluid from the water source to the enclosure.

12. The pressurisation method as in claim 11, wherein the chamber of the vessel is disposed vertically below the water level of the water source.

13. A pressurisation method for pressurising fluids comprising the steps of:

receiving fluid from a water source into a chamber of a vessel, the chamber having a longitudinal axis and being formed within the vessel, the water source having a water level and the fluid having a pressure;

enclosing a portion of the chamber with a plunger to form an enclosure having a volume, the plunger having a weight, the fluid received in the chamber being contained in the enclosure, and the plunger being movable along the longitudinal axis of the chamber to one of reduce or increase the volume of the enclosure;

gravitationally applying a force to the fluid by the plunger along the longitudinal axis of the chamber to reduce the volume of the enclosure and thereby increasing the pressure of the fluid, the pressure of the fluid being controlled by a positioning device being coupled to the plunger for positioning the plunger along the longitudinal axis thereby controlling the amount of force applied to the fluid, the positioning device comprising a hoist assembly and an electric actuator having a brake assembly for interacting with the hoist assembly to impede the reduction of the volume of the enclosure; and providing the pressurised fluid to a desalination systems wherein positioning of the plunger within the chamber is artificially controlled by the positioning device to allow the volume of the enclosure to be pre-determinable.

* * * * *